United States Patent
Kinlen et al.

(10) Patent No.: US 10,118,992 B2
(45) Date of Patent: Nov. 6, 2018

(54) FLOW REACTOR SYNTHESIS OF POLYMERS

(71) Applicant: The Boeing Company, Chicago, IL (US)

(72) Inventors: Patrick John Kinlen, Fenton, MO (US); Andrew M. Zweig, Ellisville, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/662,503

(22) Filed: Jul. 28, 2017

(65) Prior Publication Data
US 2017/0321010 A1    Nov. 9, 2017

Related U.S. Application Data

(63) Continuation of application No. 15/261,441, filed on Sep. 9, 2016, now Pat. No. 9,751,983, which is a
(Continued)

(51) Int. Cl.
*C08F 2/00* (2006.01)
*C08F 4/00* (2006.01)
(Continued)

(52) U.S. Cl.
CPC ...... *C08G 73/0266* (2013.01); *B01J 19/0093* (2013.01); *B01J 19/242* (2013.01); *B01J 19/243* (2013.01); *B01J 19/2415* (2013.01); *B01J 19/2425* (2013.01); *C09D 179/02* (2013.01); *B01J 2219/0086* (2013.01); *B01J 2219/00087* (2013.01); *B01J 2219/00164* (2013.01); *B01J 2219/00795* (2013.01); *B01J 2219/00822* (2013.01); *B01J 2219/00831* (2013.01);
(Continued)

(58) Field of Classification Search
CPC ...... F03G 7/005; F02K 7/02; A61M 31/0092; B82B 1/006
USPC .......................................... 526/64, 217, 234
See application file for complete search history.

(56) References Cited

U.S. PATENT DOCUMENTS

| | | | |
|---|---|---|---|
| 5,567,356 A | 10/1996 | Kinlen | |
| 7,819,967 B2 | 10/2010 | Kyota et al. | |
| 2013/0123427 A1* | 5/2013 | Luettgen | C08F 2/00 525/57 |

FOREIGN PATENT DOCUMENTS

| | | |
|---|---|---|
| CN | 103408754 A | 11/2013 |
| EP | 1272546 A1 | 1/2003 |

(Continued)

OTHER PUBLICATIONS

Shirakawa, Hideki, et al.; "Synthesis of Electrically Conducting Organic Polymers: Halogen Derivatives of Polyacetylene, (CH)x," Journal of the Chemical Society, Chemical Communications, 1977, pp. 578-580.
(Continued)

*Primary Examiner* — William K Cheung
(74) *Attorney, Agent, or Firm* — Christopher J. Knors; Moore & Van Allen PLLC

(57) ABSTRACT

A flow reactor system and methods having tubing useful as polymerization chamber. The flow reactor has at least one inlet and at least one mixing chamber, and an outlet. The method includes providing two phases, an aqueous phase and a non-aqueous phase and forming an emulsion for introduction into the flow reactor.

15 Claims, 10 Drawing Sheets

Related U.S. Application Data continuation of application No. 14/882,073, filed on Oct. 13, 2015, now Pat. No. 9,481,764.

(51) Int. Cl.
    *C08G 73/02*   (2006.01)
    *B01J 19/24*   (2006.01)
    *B01J 19/00*   (2006.01)
    *C09D 179/02*  (2006.01)

(52) U.S. Cl.
    CPC ............. *B01J 2219/00833* (2013.01); *B01J 2219/00837* (2013.01); *B01J 2219/00867* (2013.01); *B01J 2219/00869* (2013.01); *B01J 2219/00873* (2013.01); *B01J 2219/00889* (2013.01); *B01J 2219/00963* (2013.01); *B01J 2219/24* (2013.01)

(56) References Cited

FOREIGN PATENT DOCUMENTS

| EP | 2357036 A2 | 8/2011 |
|----|------------|--------|
| FR | 2928646 A1 | 9/2009 |
| IN | 201503030 I3 | 4/2017 |
| WO | 94/03528 A1 | 2/1994 |
| WO | 96/14343 A1 | 5/1996 |
| WO | 01/74926 A1 | 10/2001 |
| WO | 2006094706 A1 | 9/2006 |
| WO | 2012037596 A1 | 3/2012 |
| WO | 2015081095 A1 | 6/2015 |

OTHER PUBLICATIONS

Kinlen, P.J.; et al.; "Emulsion Polymerization Process for Organically Soluble and Electrically Conducting Polyaniline," Macromolecules, 1998, pp. 1735-1744, vol. 31.

Chandrakanthi, Nayana, et al.; "Thermal stability of polyaniline," Polymer Bulletin, 2000, pp. 101-108, vol. 44.

Heeger, A.J.; "Nobel Lecture: Semiconducting and metallic polymers: The fourth generation of polymeric materials," Reviews of Modern Physics, 2001, pp. 681-700, vol. 73.

Wu, Tao, et al.; "A New Synthetic Method for Controlled Polymerization Using a Microfluidic System," Journal of the American Chemical Society Communications, 2004, pp. 9880-9881, vol. 126.

Hamper, B.C., et al.; "Direct Uncatalyzed Amination of 2-Chloropyridine Using a Flow Reactor," Synthetic Letters, 2007, pp. 2257-2226, No. 14.

Wessling, Bernhard, "New Insight into Organic Metal Polyaniline Morphology and Structure," Polymers, 2010, pp. 786-798, vol. 2.

Tonhauser, Christoph, et al.; "Microflow Technology in Polymer Synthesis," Macromolecules, 2012, pp. 9551-9570, vol. 46.

Nagaki, Aiichiro, et al.; "Controlled Polymerization in Flow Microreactor Systems," Advances in Polymer Science, 2013, pp. 1-50, vol. 259.

Kumar, Anshu, et al.; "Continuous-Flow Synthesis of Regioregular Poly(3-Hexylthiophene): Ultrafast Polymerization with High Throughput and Low Polydispersity Index," Journal of Flow Chemistry, 2014, pp. 206-210, vol. 4.

Vapourtec; "Vapourtec Chips in with Micromixers," Vapourtec Micromixer reactor, downloaded from the Internet on Oct. 13, 2015 <http://www.vapourtec.co.uk/news/micromixer-reactor>.

ThalesNano Inc.; "Phoenix Flow Reactor," ThalesNano Nanotechnology Inc—Phoenix Flow Reactor, downloaded from the Internet on Oct. 13, 2016 <http://thalesnano.com/phoenix-flow-reactor>.

Syrris Ltd,; "Dolomite Flow Chemistry System," Syrris—Dolomite Flow Chemistry System, downloaded from the Internet on Oct. 13, 2015 <http://syrris.com/flow-products/dolomite-flow-chemistry-system>.

USPTO; Non-Final Office Action for U.S. Appl. No. 14/882,073 dated Jun. 13, 2016, 18 Pages.

Beesabathuni, S.N., et al.; "Fabrication of conducting polyaniline microspheres using droplet microfluidics," RSC Advances, 2013, pp. 24423-24429.

European Patent Office; Extended European Search Report for European Patent Application No. 16204785.6 dated Mar. 2, 2017, 8 Pages.

USPTO; Non-Final Office Action for U.S. Appl. No. 15/261,441 dated Feb. 1, 2017, 15 Pages.

Sapurina, I.Y., et al., Oxidative Polymerization of Aniline: Molecular Synthesis of Polyaniline and the Formation of Supramolecular Structures, New Polymers for Special Applications, Sep. 2012, chapter 9, pp. 251-312.

Russum, James P., et al.; "Continuous Living Polymerization in Miniemulsion Using Reversible Addition Fragmentation Chain Transfer (RAFT) in a Tubular Reactor," Ind. Eng. Chem. Res., 2005, pp. 2484-2493.

Saubern, Simon, et al.; "Preparation of Forced Gradient Copolymers Using Tube-in-Tube Continuous Flow Reactors," Macromolecular Reaction Engineering, 2017, 1600065, pp. 1-6.

Seyler, Helga, et al.; "Controlled synthesis of poly(3-hexylthiophene) in continuous flow," Beilstein Journal of Organic Chemistry, 2013, pp. 1492-1500.

Ding, Yan, et al.; "Emulsion Polymerization of Aniline in Dodecylbenzenesulphonic Acid/Water System," Acta Polymerica Sinica, 2008, pp. 246-250.

European Patent Office; Extended European Search Report for European Patent Application No. 16192931.0 dated Mar. 22, 2017, 8 Pages.

European Patent Office; Office Action for European Patent Application No. 16192931.0 dated Mar. 7, 2018, 6 Pages.

\* cited by examiner

FLOW REACTOR SYNTHESIS OF POLYMERS

CROSS-REFERENCE TO RELATED APPLICATIONS

This application is a continuation application of U.S. patent application Ser. No. 15/261,441, filed Sep. 9, 2016, now U.S. Pat. No. 9,751,983 which is a continuation application of U.S. patent application Ser. No. 14/882,073, filed Oct. 13, 2015, now U.S. Pat. No. 9,481,764, issued Nov. 1, 2016, entitled "FLOW REACTOR SYNTHESIS OF POLYMERS", the contents of which are incorporated herein by reference.

By appropriate design of the chemical structure, conjugated polymeric materials can be used as additives providing anti-corrosive and anti-static properties or employed in electronic applications such as organic light-emitting diodes (OLED), solar cells, semiconductors, display screens and chemical sensors. Conjugated polymeric materials, however, typically suffer from high manufacturing costs, material inconsistencies and processing difficulties when prepared by batch processes.

Despite these advances, using current methods there are limitations to the expanded use of conductive polymers. For example, polyaniline (PANI or "emeraldine") is one such conductive polymer that, due to high manufacturing costs, material inconsistencies and batch processing difficulties, is not fully exploited. PANI is widely used in printed board manufacturing as a final finish; protecting the copper and soldered circuits from corrosion. PANI is commonly prepared by chemical oxidative polymerization of aniline in an aqueous solution. Material obtained by this approach is amorphous and insoluble in most organic solvents. PANI reaction times are relatively long (e.g., many hours). Many of the current flow reactors under evaluation use microfluidic chips or miniaturized columns and specialized equipment for control of the flow devices that adds cost and complexity to the process.

SUMMARY

In a first embodiment, method is provided, the method comprising forming an emulsion of a monomer and an acid; introducing the emulsion into a flow reactor, the flow reactor comprising a length of tubing of inner diameter between about 1 to about 4000 microns; and polymerizing the monomer and forming the acid salt thereof.

In one aspect, the method further comprises recovering the salt of the polymerized monomer. In another aspect, alone or in combination with any of the previous aspects, the method further comprises introducing a catalyst to the emulsion or the flow reactor.

In another aspect, alone or in combination with any of the previous aspects, the emulsion comprises an aqueous solution of the monomer and an organic solvent solution of the acid.

In another aspect, alone or in combination with any of the previous aspects, the length of tubing is coiled.

In another aspect, alone or in combination with any of the previous aspects, the salt of the polymerized monomer is substantially contained in the length of tubing, wherein the tubing is a fluoropolymer. In another aspect, alone or in combination with any of the previous aspects, further comprising removing unreacted material from the tubing with water. In another aspect, alone or in combination with any of the previous aspects, the method further comprises recovering the salt of the polymerized monomer from the tubing with organic solvent.

In a second embodiment, a method is provided, the method comprising forming an emulsion of aniline and an organic or sulfonic acid; introducing the emulsion into a flow reactor, the flow reactor comprising a length of tubing of inner diameter between about 1 to about 4000 microns; and introducing an oxidant to the emulsion or the flow reactor; and polymerizing the aniline in the inner diameter of the length of tubing and forming the acid salt thereof.

In one aspect, the length of tubing is coiled. In another aspect, alone or in combination with any of the previous aspects, the salt of the polymerized aniline is substantially contained in the length of tubing, wherein the tubing is a fluoropolymer.

In another aspect, alone or in combination with any of the previous aspects, the method further comprises recovering the salt of the polymerized aniline from the tubing with organic solvent.

In another aspect, alone or in combination with any of the previous aspects, the molar ratio of the aniline to the organic or sulfonic acid is between 1 and 0.2. In another aspect, alone or in combination with any of the previous aspects, the total flow rate for the aniline is about 0.01 mmole/min to about 0.2 mmole/min, resulting in an emulsion reaction mixture flow rate of 0.1 mL/min to about 0.5 mL/min into the flow reactor. In another aspect, alone or in combination with any of the previous aspects, the oxidant is introduced at a flow rate from about 0.001 to about 0.2 mL/min.

In a third embodiment, polymerization apparatus is provided for reacting one or more monomers producing one or more polymers, the polymerization apparatus comprising: an amount of tubing of inner diameter between about 1 to about 1000 microns, the tubing including at least one inlet and at least one outlet, the amount of tubing having at least one inlet port for receiving a reactant composition and at least one outlet port; a temperature controller sized to receive at least a portion of the tubing; a mixing chamber, the mixing chamber having an outlet fluidically coupled to the inlet of the tubing, and an inlet; and at least one fluid flow control device fluidically coupled to the inlet of the mixing chamber.

In one aspect, the tubing is wound around the temperature controller.

In another aspect, alone or in combination with any of the previous aspects, the at least one fluid control device comprises a monomer fluid flow control device and an acid fluid flow control device. In another aspect, alone or in combination with any of the previous aspects, the apparatus further comprises a second mixing chamber fluidically coupled to the outlet of the mixing chamber and the inlet of the tubing. In another aspect, alone or in combination with any of the previous aspects, the apparatus further comprises a catalyst fluid flow control device fluidically coupled to the second mixing chamber or to the tubing.

BRIEF DESCRIPTION OF THE DRAWINGS

Further advantages of the present disclosure are apparent by reference to the detailed description when considered in conjunction with the figures, which are not to scale, wherein like reference numbers indicate like elements throughout the several views.

DETAILED DESCRIPTION

A preparation of polyaniline-dinonylnaphthalene sulfonic acid (DNNSA) (hereinafter also referred to as "PANI-DNNSA") as a solvent-soluble polymer by flow reactor chemical processing is disclosed herein. The disclosed system and methods provide unique processing sequences for direct collection of the purified emeraldine salt without post reactor manipulation. The present systems and methods provide improvement over known methods of synthesizing conductive polymers, and in particular conductive polymer salts, for example, PANI-DNNSA using very short reaction times not otherwise obtainable using conventional methods, which require long reaction times.

By way of example, the present systems and methods provides improvement in the efficient and controlled synthesis of polyaniline (PANI) salt as a soluble, intrinsically conductive polymer. A continuous flow synthesis of PANI dinonylnaphthalene sulfonic acid salt (PANI-DNNSA) or "emeraldine salt" is herein described using a flow reactor. In some examples the flow reactor comprises a microfluidic (1 to about 750 um I.D.) tube reactor. In some examples, the microfluidic tube comprises a fluoropolymer, e.g., TEFLON®. The tube reactor provides a suitable surface for deposition of the forming polymer and a straightforward purification of the conductive polymer salt.

As used herein, the phrase "flow reactor" is inclusive of a micro-flow reactor. A micro-flow reactor is used herein as a flow reactor having flow dimensions, e.g., tubing inner diameter (I. D.), less than 1 mm (1000 microns).

As further described below, in some examples as the polymerization reaction preceded, the majority of the polymer product deposits on the walls of the tubing. The polymeric product can be purified by washing with water to remove aqueous soluble reactants, reagents, and side products.

The conductive polymer salts formed in the flow reactor and deposited on the walls of the tubing can be eluted with organic solvent to provide soluble conductive polymer salt suitable for solid casting, film forming, or precipitation. The method provides for the preparation of conductive polymer salts having a ratio of conductive polymer monomer to salt of about 1:1 to about 1:0.2. The apparatus is configurable for in-situ characterization e.g., by UV-Vis spectroscopy, infrared, and/or mass spectroscopy.

An apparatus and related methods for polymerizing at least one reactant are described. In certain examples, the apparatus is a microfluidic apparatus comprising a mixing chamber and microchannel. In addition, the reactor can further comprise an output chamber and a detection unit that is operatively connected to the microchannel.

Figure 1A:
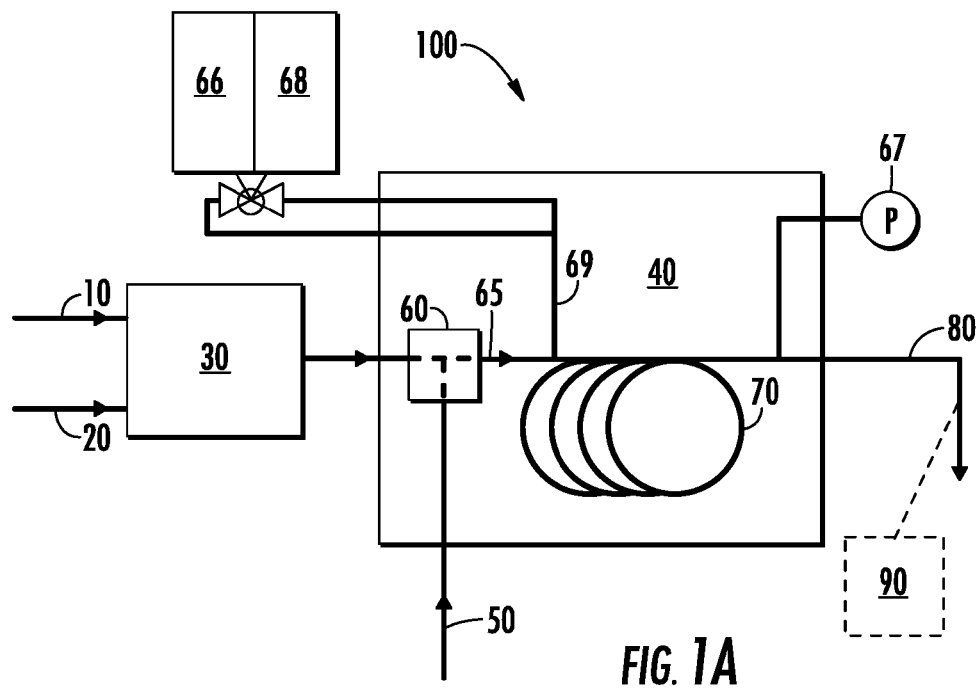
FIG. 1A is a diagram of an exemplary flow reactor system as disclosed and described herein.

With reference to FIG. 1A, flow reactor system 100 shown. First reactant 10 and second reactant 20 are introduced to first mixing unit 30. The reactor system 100 shown in FIG. 1A can produce conductive polymer salts (mass/per unit time) more efficiently than conventional macroscale devices or batch reactors. Flow reactor 100 is capable of operating at a range of processing temperatures from room temperature to about 250° C., and most advantageously at process temperatures less than 100° C. Room temperature is inclusive of at least above the freezing point of water to less than the boiling point of water. In some examples, ambient temperature is between about 50° F. (10° C.) to about 90° F. (32° C.). In some examples reactants 10, 20 are introduced, independently, to the first mixing unit 30 at a predetermined flow rate and/or predetermined concentration such that a desired molar ratio of reactants 10, 20 are mixed prior to being introduced to the flow reactor. In other examples, reactants 10, 20 are introduced together to the first mixing unit 30 such that a desired molar ratio of reactants 10, 20 are mixed prior to being introduced to the flow reactor. First mixing unit 30 can be any conventional mixing device. In some examples, the mixing device is a high-speed or ultra-high speed mixing device capable of emulsifying one or more solutions, for example an aqueous solution and a non-aqueous solution. In some examples, first reactant 10 is contained in an aqueous solution and second reactant 20 is contained in a non-aqueous solution, whereas first mixing unit 30 is designed for emulsifying first reactant 10 and second reactant 20. Third reactant 50 joins first and second reactants in second mixing unit 60. In some examples, reactant 50 is a catalyst. After mixing and second mixing unit 60, reactants are introduced to tubing 70 via inlet port 65. Tubing 70 comprises discharge port 80, which can be monitored by analysis equipment 90. Analysis equipment 90 can include spectroscopic equipment to interrogate and analyze materials flowing from discharge port 80, such as unreacted materials and/or reaction products. Spectroscopic equipment includes UV-Vis, IR (near-, mid-, and far-IR), and mass spectroscopy. Other analytical and interrogating techniques can be used, such as capacitance, pH, etc. Pressure regulating unit 67 can be positioned at the outlet of flow reactor 70 for monitoring a change in pressure during polymerization or during the collection step of polymerized material and information from pressure regulating unit 67 can be used by a controller to cease introduction of the monomer to the flow reactor. An additional pressure regulating unit 67 can also be positioned at the inlet of flow reactor 70 for example, for monitoring changes in pressure during the process. Fluid lines 69 can be independently fluidically coupled to flow reactor 70 so as to introduce purging media 66 (e.g., water) or collecting medium 68 (e.g., solvent) for collecting polymerization product from flow reactor units 70.

In some examples, flow reactor system 100 has a single inlet port to the tubing 70. In other examples, flow reactor system 100 has additional inlet ports positioned between inlet port 65 and discharge port 80. As shown in FIG. 1A, tubing 70 can be coiled around to provide an extended tubular flow reactor.

In some examples, tubing 70 is contained in housing 40 that provides temperature control and/or support and/or protection from damage of the tubing 70. In some examples, housing 70 has an inside surface surrounding at least a portion of the tubing 70 such that the coiled tubing 70 is at least partially contained within the housing 40. In some examples, housing 40 is configured to provide temperature control to the tubing 70, which includes heating and/or cooling.

Figure 1B:
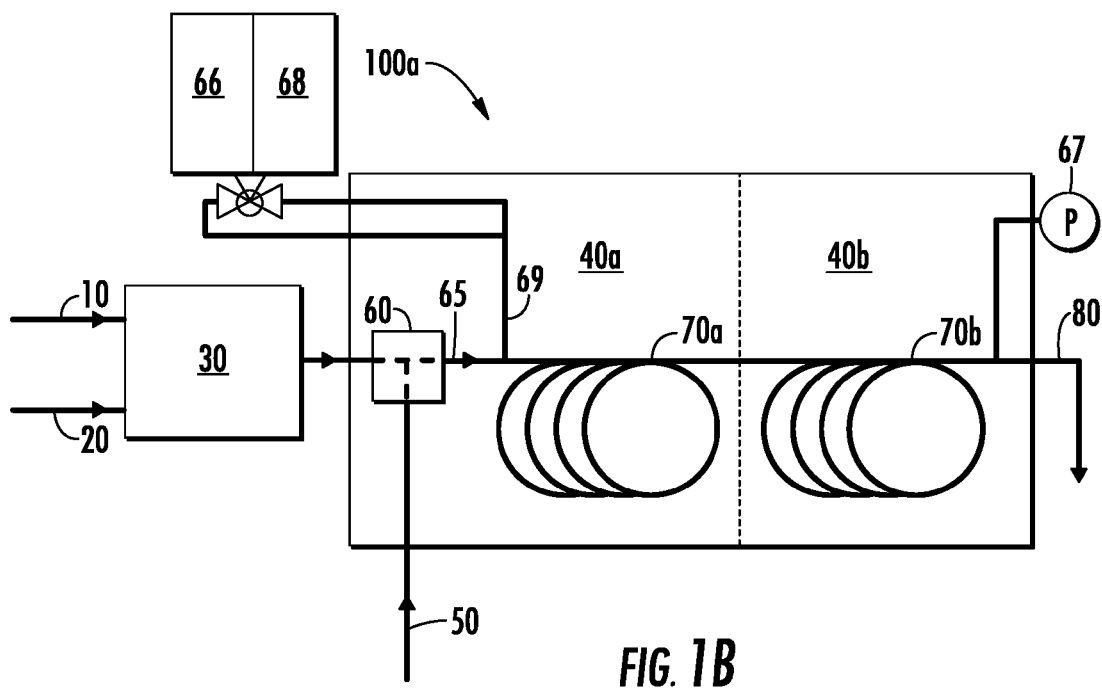
FIG. 1B is a diagram of an exemplary series flow reactor system as disclosed and described herein.

As shown in FIG. 1B, alternate flow reactor configuration 100a is shown with plurality of tubing 70a, 70b arranged in a coil configuration coupled in series. Tubing 70a, 70b can be dimensionally the same or can have different lengths and/or different inner diameters. In this configuration, the housing can be bifurcated into separate, sections 40a, 40b receiving tubing 70a, and 70b that can be independently manipulated for heating and/or cooling the tubing. Alternatively, flow reactor configuration 100a can have a single housing receiving tubing 70a, 70b. In contrast to a parallel array configuration of the tubing, where the process stream is split prior to entering the flow reactor, the series array maximizes the amount of time that the reaction mixture is maintained in a diffusion-limiting condition. While not to be held by any particular theory, it is believed that maintaining the reaction mixture in a diffusion limiting condition provides improvement of the presently disclosed reactions for producing conductive polymer salts from reactants in emulsion compared to batch processing. The present methods and systems disclosed herein provide for such a diffusion limiting condition for the emulsion of reactants.

Figure 1C:
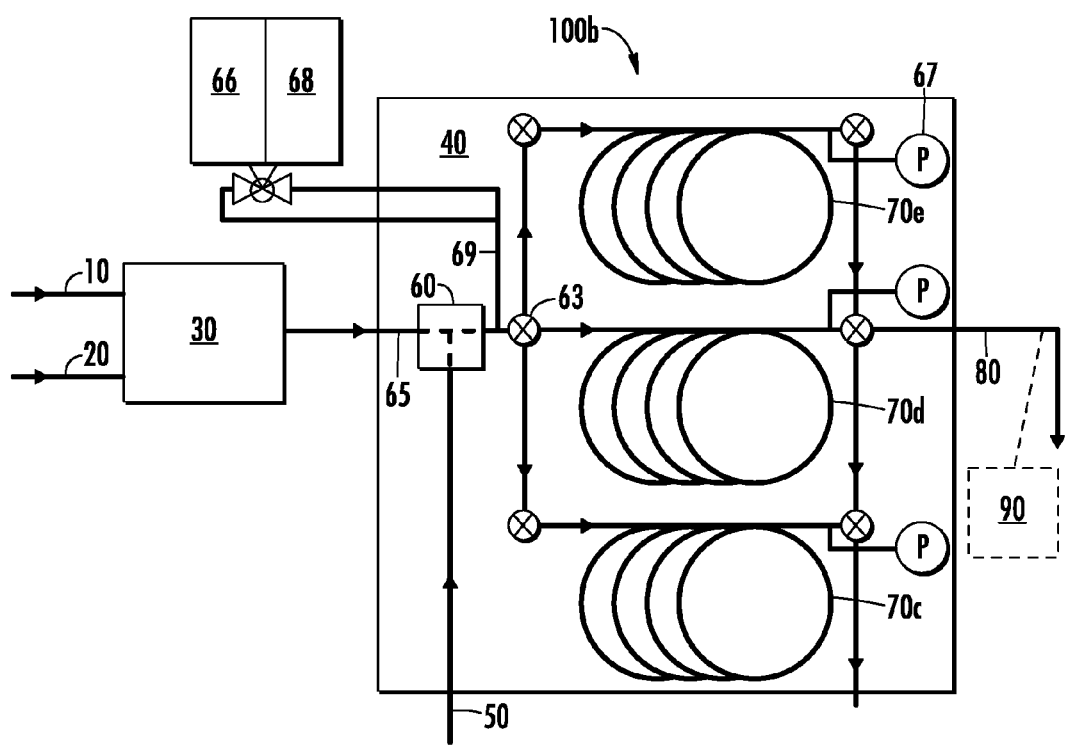
FIG. 1C is a diagram of an exemplary parallel flow reactor system as disclosed and described herein.

With reference to FIG. 1C, an exemplary flow reactor system 100b is shown. A plurality of flow reactor units 70c, 70d, and 70e, are shown in a parallel flow configuration. Each flow reactor 70c, 70d, and 70e, independently, can be isolated via flow control valves 63 situated at the inlet and outlet of each flow reactor introduction of monomer solution to the corresponding flow reactor. Flow control valves 63 can be manually operated and/or solenoid-based configured for computer-control using conventional controlling devices. Flow control valves 63 can contain one or more check valves for preventing backflow of dispersion solution. One or more pressure regulating units 67 can be positioned at the outlet of one or more of the flow reactors for monitoring a change in pressure during polymerization or during the collection step of polymerized material. Additional pressure regulating units 67 can also be positioned at the inlet of each flow reactor. Flow control valves 63 can be coupled to pressure data from the controller so as to isolate one or more of the flow reactors 70c, 70d, and 70e, for activating purge and/or polymer recovery. In this configuration, flow reactor system 100b can be continuously operated by selectively isolating one or more flow reactor units 70c, 70d, and 70e for collecting polymerization product and/or maintenance while maintaining monomer introduction to one or more of the remaining flow reactor units. Alternatively, flow reactor system 100b can be semi-continuously operated, for example by temporarily ceasing the introduction of monomer to one or more of the flow reactor units 70c, 70d, and 70e. Additional fluid lines 69 can be independently fluidically coupled to one or more of the flow control valves 63 so as to introduce purging media 66 (e.g., water) or collecting medium 68 (e.g., solvent) for collecting polymerization product selectively from one or more flow reactor units 70c, 70d, and 70e. One or more of flow reactor units 70c, 70d, and 70e can be physically removed from flow reactor system 100b for transport with or without polymerization product recovered from in the inner diameter of the tubing.

Figure 2:
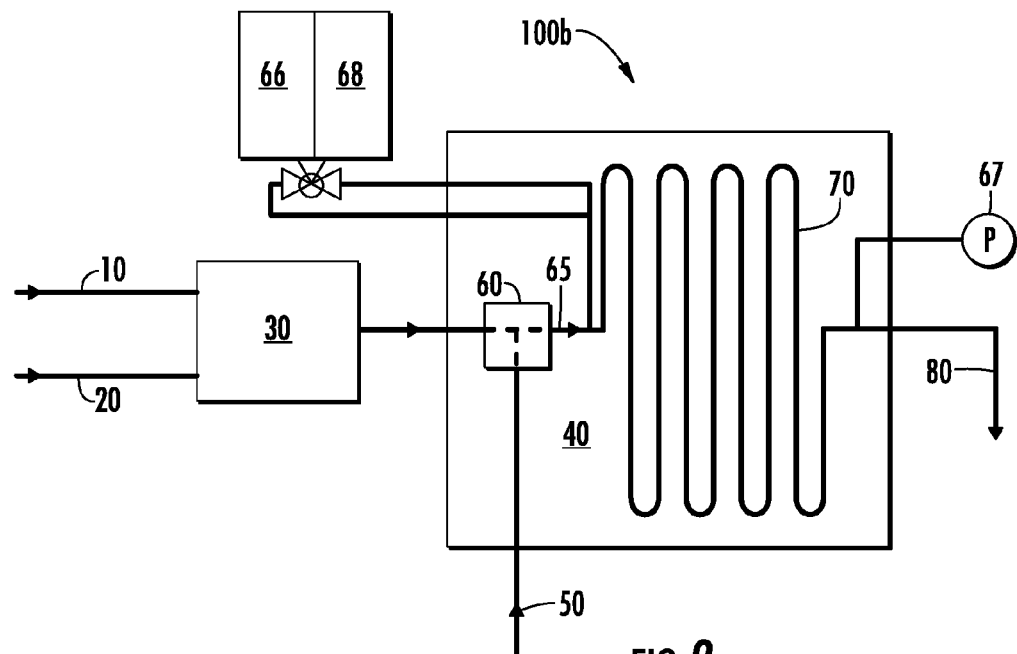
FIG. 2 is a diagram of another exemplary flow reactor system as disclosed herein.
Figure 3:
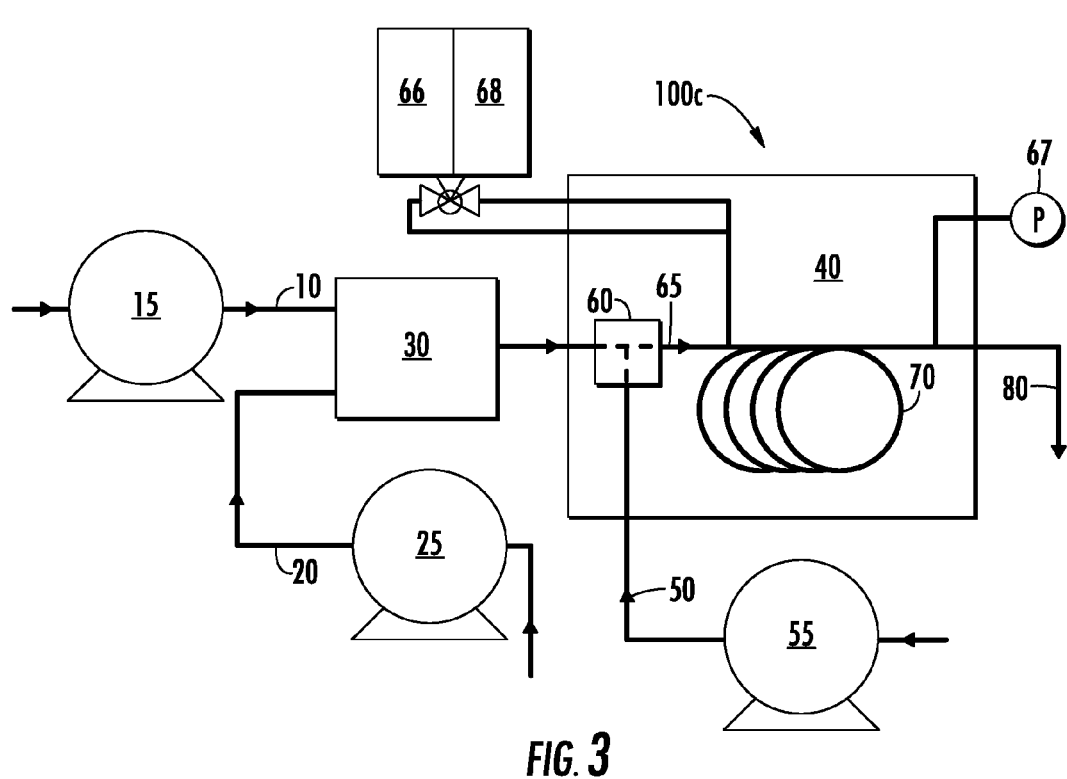
FIG. 3 is a diagram of another exemplary flow reactor system as disclosed and described herein.

With reference now to FIGS. 2 and 3, alternate flow reactor configurations are shown. Thus, system 100b has a linear tubing 70 arrangement. In some examples, the cross-section of the tubing 70 in the system 100b is rectangular or other shapes with cross-sectional dimensions each independently of about 100 micron to 4000 microns. FIG. 3 shows system 100c that includes pumping equipment 15, 25, 55 for introducing reactants 10, 20, and 52 mixing units 30, 60. Pumping equipment can include syringe pumps, rotary valve pumps, displacement pumps and the like.

Figure 4:
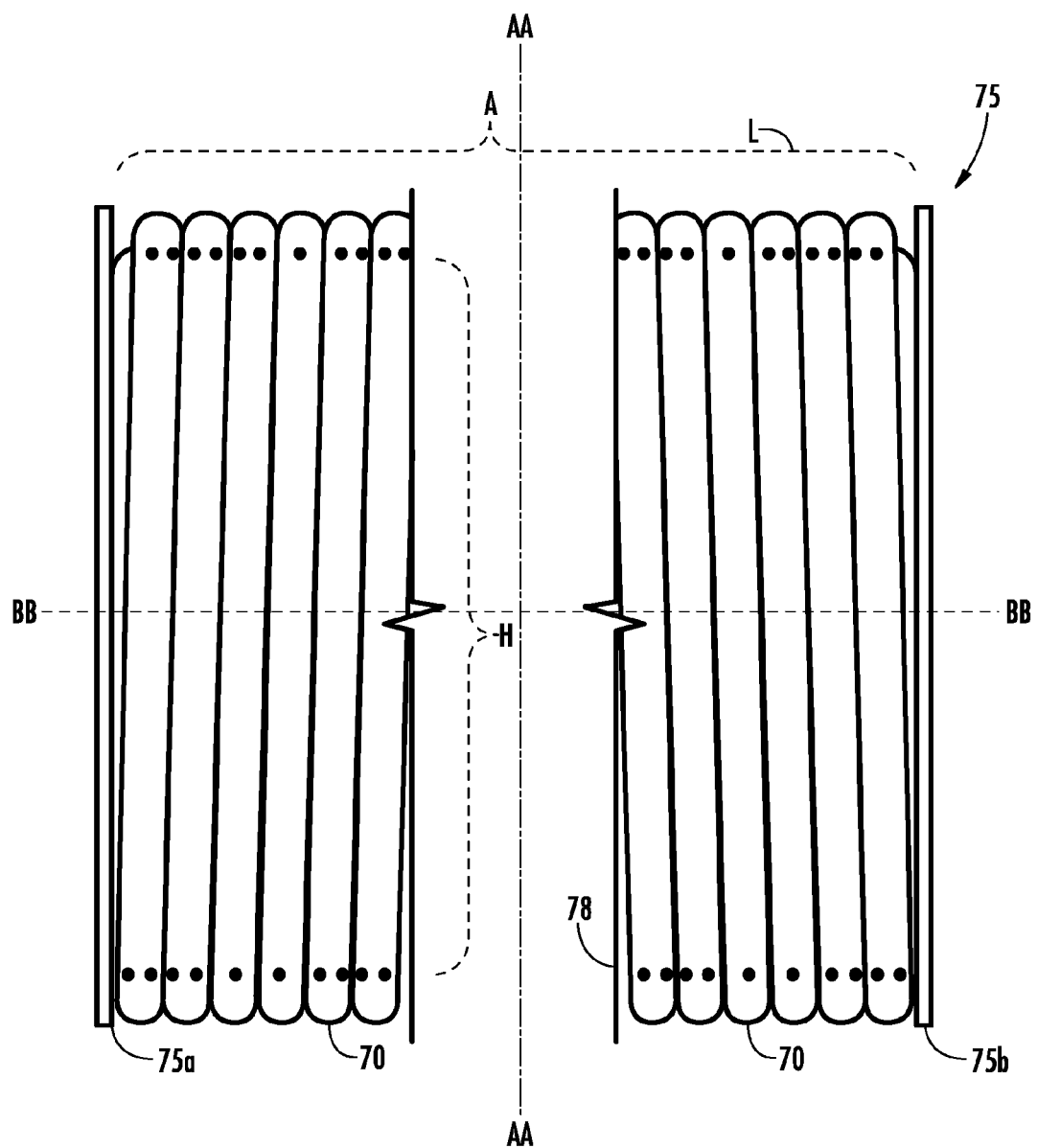
FIG. 4 is a diagram of a spool flow reactor as disclosed and described herein.

With reference to FIG. 4, in some examples, tubing 70 is coiled or wound as shown on or about the surface of temperature control member 75. Temperature control member 75 is of a length L separated by member 78, which can be a cylinder, between members 75a, 75b of height H for providing the predetermined length of tubing and/or support and/or heating/cooling. In some examples, tubing 70 is coiled or wound substantially about the surface of temperature control member 75. The longitudinal axis of the surface of temperature control member 75 (as shown by line B-B) is substantially perpendicular to the turns of the tubing 70. In some examples, for a large temperature control member composed of a metal block with resistance heating, the system can be configured to allow heat to enter from the block (inner side of the coiled or wound tubing) and at least partially exit through convection through the outside against the environment. For configurations of the flow reactor system 100 that may require the reactor to be run with cooling, a complete immersion of the reactor tubing in housing 40 can be provided. In other examples, tubing 70 is not wound coils but some other arrangement configured for heat management from all sides of the tubing, not just one side or face. Temperature control member 75 can be configured for cooling medium or for receiving an electrical resistance heating or other forms of heat that can be controlled by one or more processors configured to a control unit. In one aspect, coiled tubing 70 is essentially the same interior diameter throughout the coiled section. In other aspects the interior diameter of coiled tubing 70 varies from inlet port 65 to discharge port 80.

In some examples, housing 40 is used in combination with temperature control member 75. The housing can be constructed of metal, ceramic, or plastic and may include one or more of heating elements, cooling elements, temperature sensors, pressure sensors and the like. Tubing 70 can be encompassed by housing 40 to provide support and/or protection. In some examples, the flow reactor system 100 is a microfluidic reactor. In one aspect, reactor system 100, comprises microfluidic tubing 70, such as tubing with an inner diameter of less than about 1000 microns, less than about 900 microns, or less than about 800 microns to a minimum diameter of about 100 microns, coiled or wound into a coil about an outer surface of temperature control member 75. In some examples, the turns of the tubing 70 are very closely spaced with one another. In some examples, the distance, independently, between one or more turns of the tubing 70 is between about zero (0) and 100 microns. In some examples, turns do not result in the touching of the tubing. In other examples, turns of the tubing result in restricting or preventing airflow between the turns of the tubing for improving heat management.

In other examples, housing 40 is a climate controlled environment configured for heating and/or cooling of the tubing. In such a configuration, spacing between turns of the tubing 70 can be used to facilitate heat management. Heat management configurations of the housing 40 in combination with the tubing 70 can comprise the use of either liquid, solid, or gas.

Figure 5:
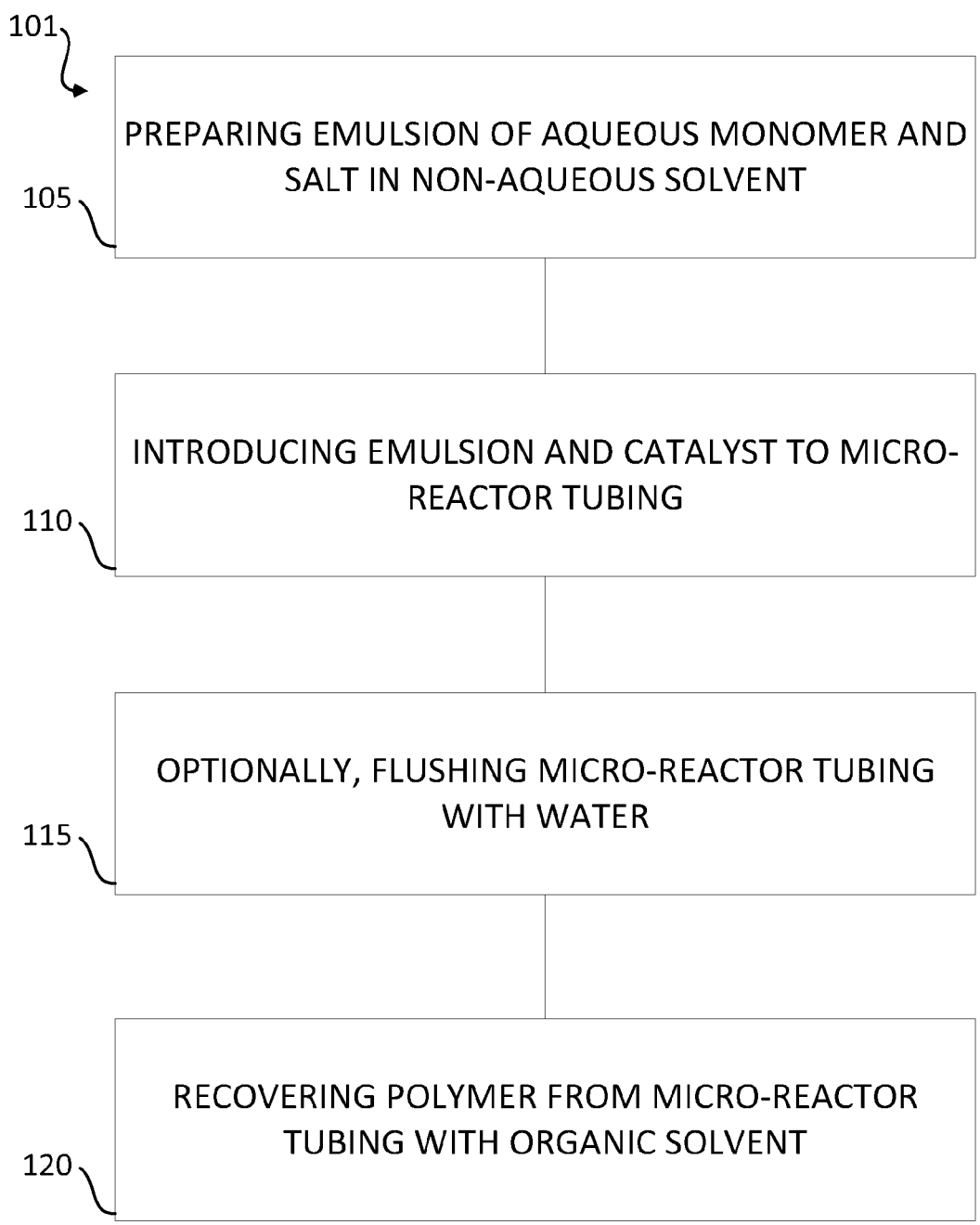
FIG. 5 is a process flow diagram of a polymerization method using the system and methods disclosed and described herein.

With reference to FIG. 5, process flow 101 is depicted as exemplary of the methods disclosed herein. Thus preparing an emulsion of aqueous monomer and a salt in a non-aqueous solvent is depicted in Step 105. Introducing the emulsion and a catalyst to the micro reactor tubing is depicted in Step 110. After predetermined time, flow of one or more of the reactants can be terminated and optionally, flushing of the micro reactor tubing with water can be performed as shown in Step 115. Step 115 can be performed so as to remove unreacted reactants and/or low molecular weight products. Recovering polymer from the micro reactor tubing with organic solvent is performed in Step 120.

Figure 6:
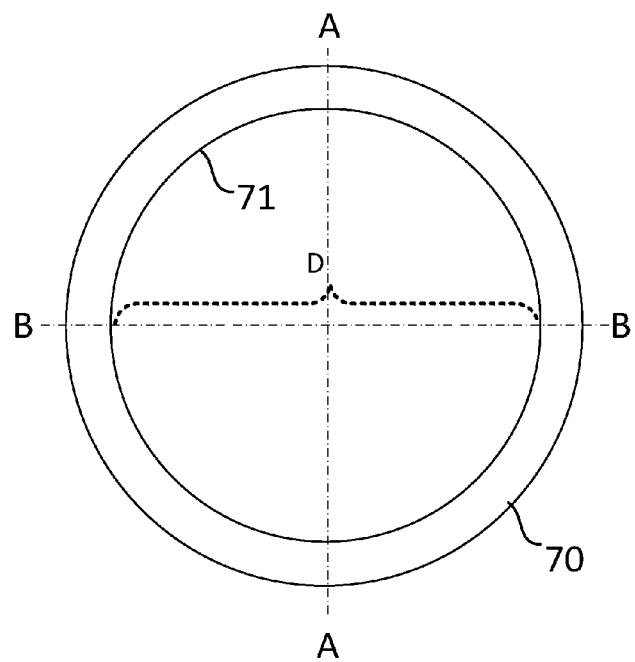
FIG. 6 is a cross-sectional view of the flow reactor inner diameter area.
Figure 7:
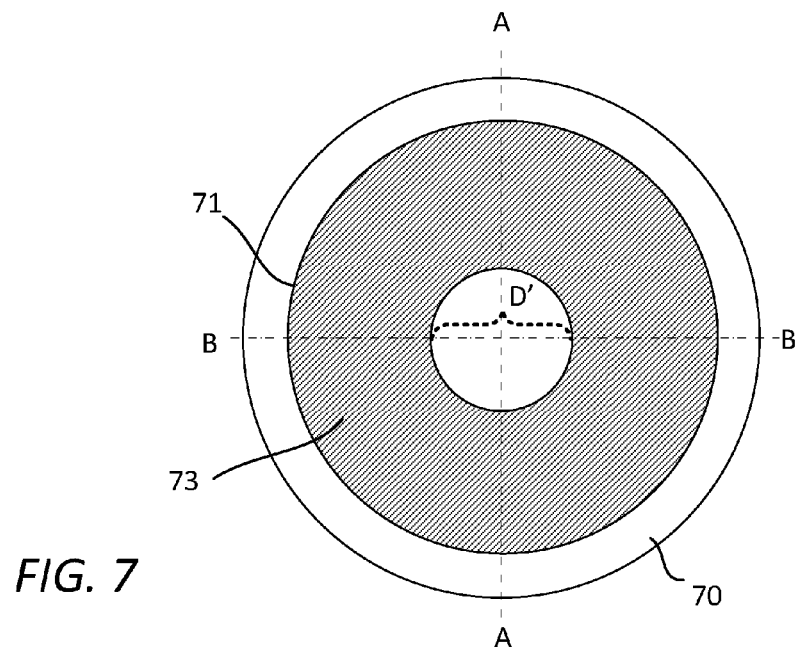
FIG. 7 is a cross-sectional view of the flow reactor inner diameter area with conductive polymer reaction product occupying a portion of the inner diameter area.

With regard to FIGS. 6 and 7, a sectional view of the tubing 70 with internal surface 71 of tube bore having an internal diameter D. in some examples, a maximum diameter is less than the diameter at which advantages of diffusion-limited reaction diminishes. This maximum diameter can be as much as 4000 microns, similar to tubing diameter used for high pressure tubing. In other examples, optimal results may be obtained using diameters less than 4000 microns, less than 3000 microns, or less than 1000 microns to a minimum diameter of about 100 microns. While not to be held to any particular theory, it is believed that faster reaction rates for the reactions disclosed and described herein occur with decreasing reactor tubing inner diameter dimensions, as much as $10^4$ to $10^6$ in microfluidic systems as previously reported with some trade-off of reaction volume per unit time. In one example the capillary to 70 is made of glass, metal, plastic or glass or metal that is coated on its inner surface with a polymer e.g. a fluoropolymer. The tubing may be encased in another polymer or be metal coated.

Tubing length can be chosen based on the ability of the selected components of the system (pump, tubing burst strength, fittings, etc.) to handle pressure. The maximum length of tubing suitable for use with the presently disclosed system is a function of back-pressure and the ability to transport product through the entire length of the tubing. In some examples, the system can be configured to operate at a tubing length coupled with a tubing inner diameter such that the system operates at or below about 20 bar (280 psi). In some examples, the length of tubing does not exceed 500 meters with tubing having an inner diameter of less than 4000 microns. In other examples, the tubing 70 is tubing of diameter less than 1000 microns (microfluidic tubing) with a length of about 100 meters or less. Other combinations of tubing diameter and to be length can be used commensurate with the operating parameters of the system and the desired reaction volume per unit time.

The cross-section of the tubing may be any shape, but preferably is circular. In some examples, polymerization occurs on internal surface 71 of tube bore as shown in FIG. 7 where polymerization product 73 restricts the internal diameter D to a reduced diameter D'. In some examples, the tubing inner diameter or the reduction in internal diameter D is symmetrical about longitudinal axes A-A, B-B. In some examples, the tubing inner diameter or the reduction in internal diameter D is non-symmetrical about longitudinal axes A-A, B-B. This reduction in diameter D to diameter D' of the tubing 70 causes a back pressure that can be measured and/or used in part to control the process herein.

Figure 8:
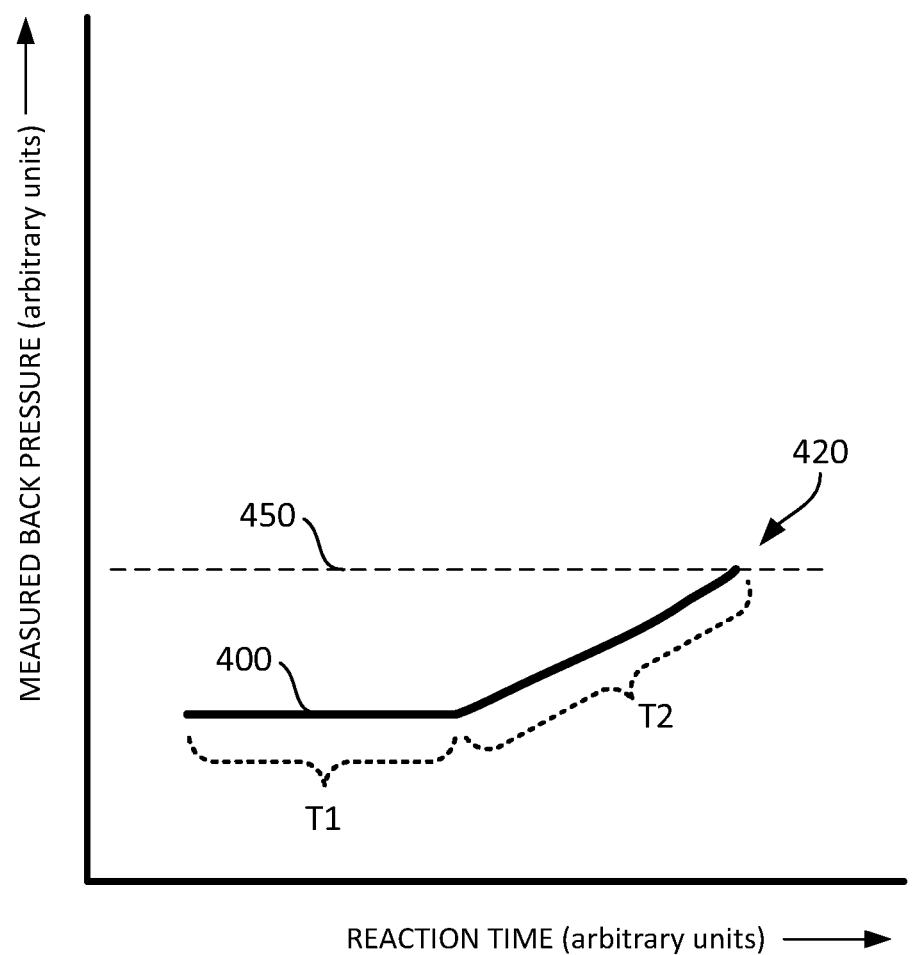
FIG. 8 is a graphical representation of exemplary back pressure versus reaction time in accordance with the present disclosure.
Figure 9:
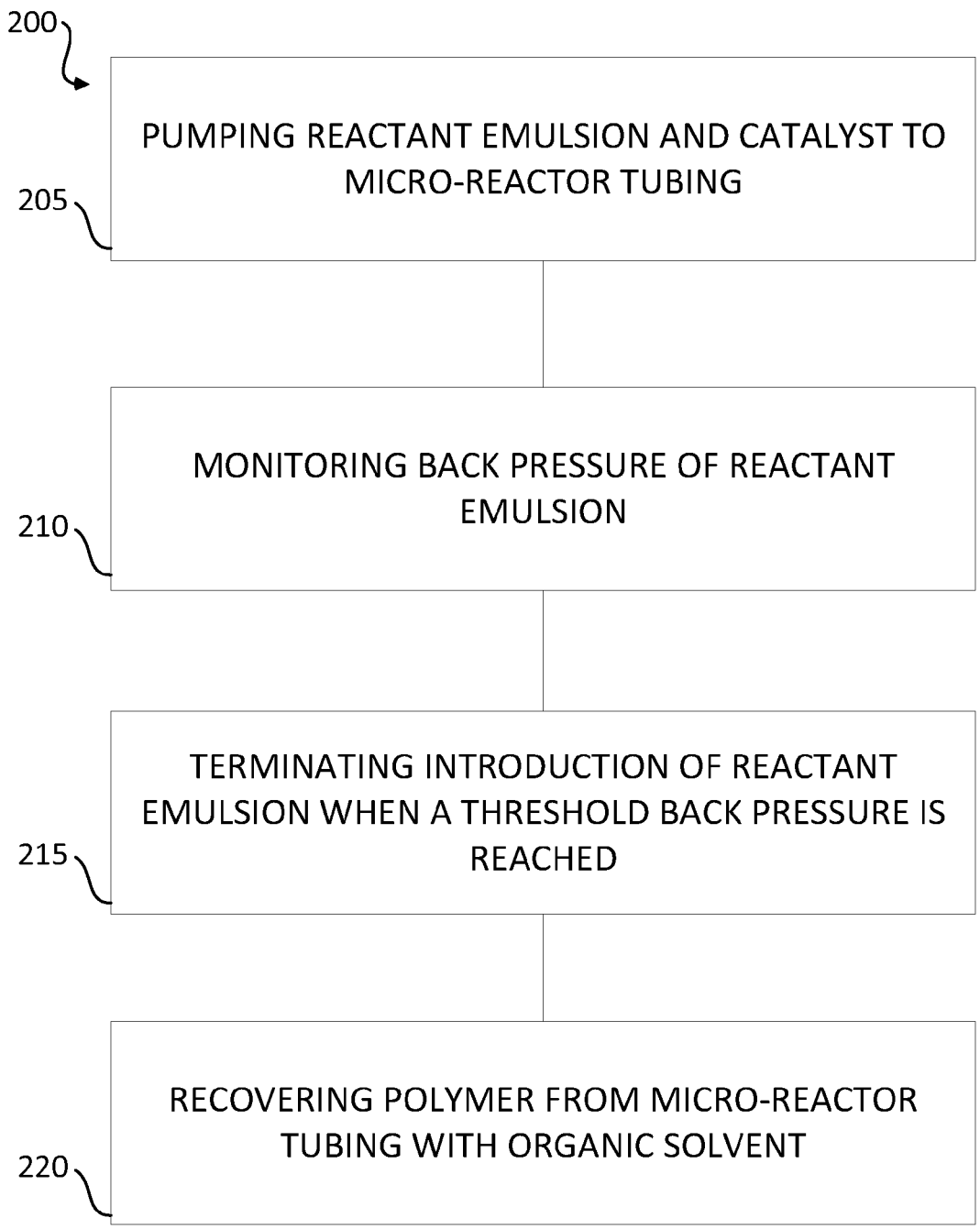
FIG. 9 is a process flow diagram of a polymerization method using the system and methods disclosed and described herein.

As shown in FIG. 8, this back pressure can be monitored whereas at the beginning of polymerization back pressure 400 at time T1 is consistent with the viscosity and flow rate of the emulsified reactant mixture being fed into tubing 70. During a time period T2, where polymerization has caused a reduction in the internal diameter of tubing 70, the back pressure begins to increase and approaches a threshold 450. In some examples the system is designed to terminate polymerization when the back pressure value 420 reaches the predetermined threshold 450. The rate of change of the back pressure as depicted in time period T2 can be adjusted taking into account the burst strength of the capillary tubing and other reactor parameters by manipulation of the viscosity of the reactants, the molar concentration of the reactants and/or catalyst, temperature, flow rates and combinations thereof. FIG. 9 depicts a process flow diagram 200 that represents an example of the presently disclosed method. Thus, pumping reactant emulsion and catalyst into the micro reactor tubing is depicted by Step 205. Monitoring back pressure of the reactant emulsion during the polymerization process is depicted in Step 210. Using conventional pressure monitoring equipment either external or electrical with the pumping devices is envisioned. Introduction of the reactant emulsion is terminated once the threshold back pressure is reached as depicted in Step 215. Recovering the product polymer from the micro reactor tubing by flushing with organic solvent is depicted in Step 220.

By way of example, the method disclosed herein can be applied to the manufacture of conjugated conductive polymer polyaniline-dinonylnaphthalene sulfonic acid salt ("PANI-DNNSA"), which is a conductive polymer for electronic applications such as organic light-emitting diodes (OLED), solar cells, semiconductors, display screens and chemical sensors.

Thus, and an exemplary example, a continuous flow synthesis process of PANI-DNNSA salt is provided. The flow apparatus was designed to allow addition of the oxidative reagent to a preformed emulsion of aqueous aniline and the organic soluble DNNSA. Our first test case evaluates the emulsion polymerization of equimolar amounts of aniline and DNNSA in the presence of ammonium persulfate as the oxidative catalyst. The reaction is depicted below in Equation (1):

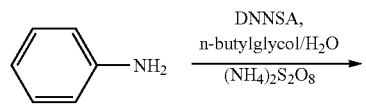

(Eq. 1)

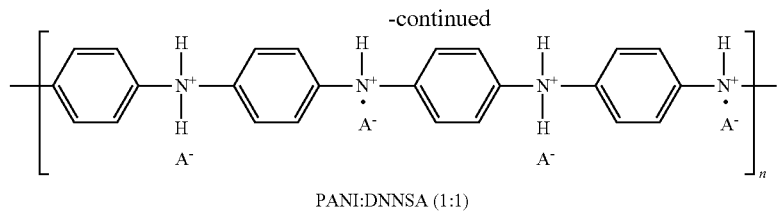

PANI:DNNSA (1:1)

Figure 10:
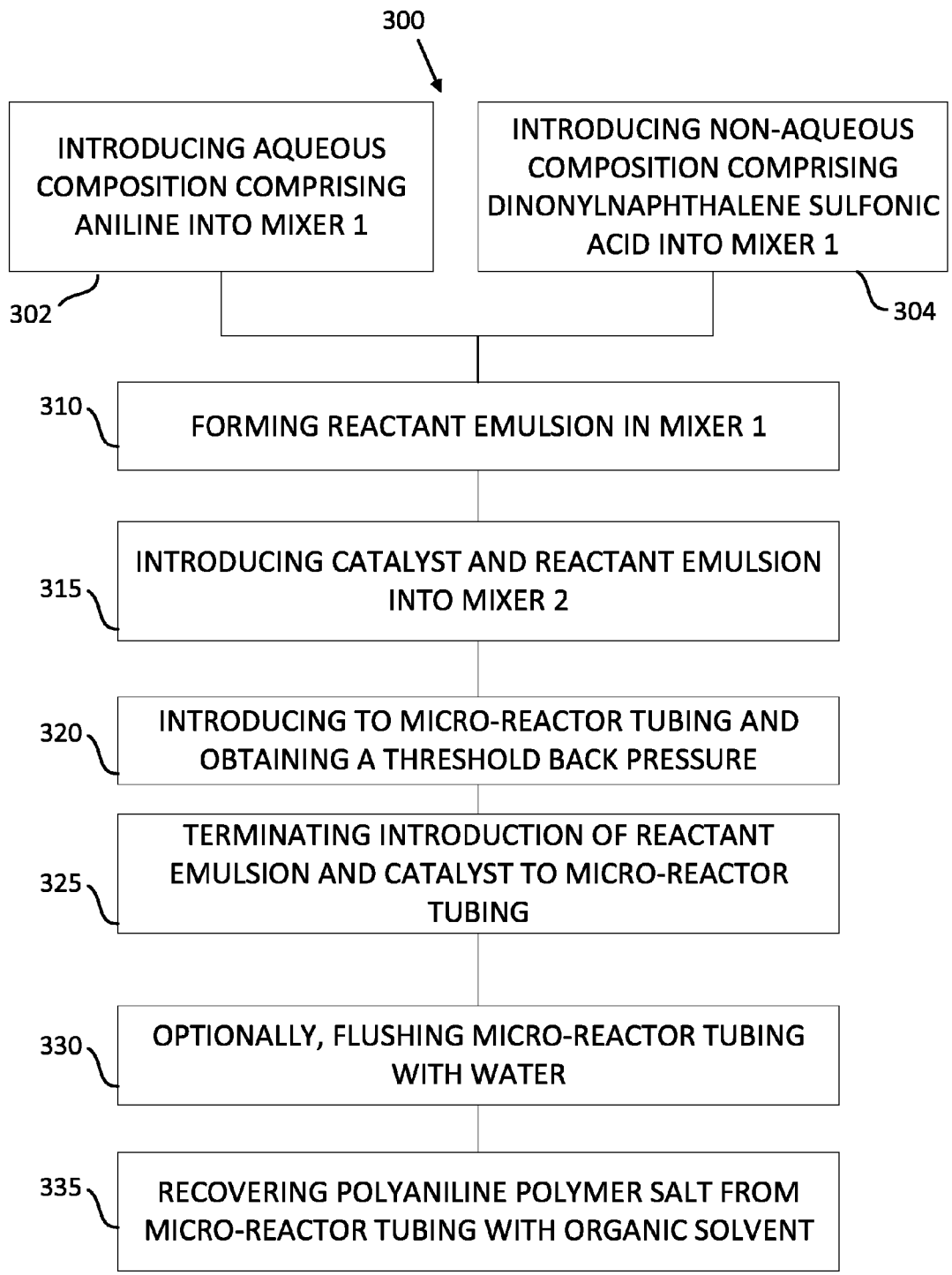
FIG. 10 is a process flow diagram of a polymerization method of PANI-DNNSA using the system and methods disclosed and described herein.

Thus, with reference to FIG. 10, process flow diagram 300 is shown. Steps 302 and 304 introduce an aqueous composition comprising aniline and a non-aqueous composition comprising dinonylnaphthalene sulfonic acid (DNNSA), respectively into a first mixer. Forming a reactant emulsion in the first mixer is performed in Step 310. Introducing a catalyst and the reactant emulsion into a second mixer is performed in Step 315. Introducing to the micro reactor tubing and obtaining a threshold back pressure is performed in Step 320. Terminating introduction of reactant emulsion and catalyst to micro reactor tubing is performed in step 325. Optionally, the micro reactor tubing can be flushed with water in Step 330 to remove unreacted material and/or low molecular weight polymer. Recovering polyaniline polymer salt from micro reactor tubing with organic solvent is carried out in Step 335.

Experimental Section

Dinonylnaphthalene sulfonic acid (DNNSA) was obtained from King Industries (Norwalk, Conn., USA) as a 50% w/w solution in n-butylglycol. The UV-Vis spectra were collected using a Hitachi U-3900 spectrometer. A film of the sample was prepared by drying a xylene solution in a quartz cuvette overnight and subsequent drying in vacuo. The cuvettes were placed on the side to allow for a consistent film to form over the quartz glass. Impurity profiles of the PANI:DNNSA samples were analyzed by reverse phase High Performance Liquid Chromatography (HPLC) to check for residual starting materials and solvents.

Flow Equipment.

A tubular flow reactor coil was prepared from 1/16" O.D.× 0.031" I.D. TEFLON® tubing of approximately 21 m (70 ft) in Length. The tubing was wrapped around an aluminum spool 4" in diameter with a height of 4.25". These dimensions for the spool allow for a single layer of 65 turns of the TEFLON® tubing. A calculated volume of the 'TEFLON® flow reactor was 10.4 mL based on the dimensions. Measured volume including dead volume before and after the reactor coil was 11.4 mL. The assembled TEFLON® flow reactor was fitted to a custom built aluminum spindle fitted with a 120V Firewire heater. Temperature control was achieved with a Model 150 J-KEM temperature controller (J-KEM Scientific, Inc., St. Louis, Mo.) attached to a K-type thermocouple and the heating unit in the aluminum block. Reagents were introduced into the reactor coil by the use of three separated syringe pumps equipped with plastic or glass syringes. Two KD Scientific (K-100 and K-250) and a Sage (Model #355) syringe pumps were employed. The first mixer for combining solutions of aniline and DNNSA consisted of a modified Rainin HPLC mixer unit with a magnetically driven TEFLON® stirrer in a stainless steel cylinder. Introduction of the oxidation catalyst ammonium persulfate was carried out with a standard HPLC T-fitting (SS, 0.040" I.D.). Collection of fractions from the reactor coil was achieved either by manually changing fractions or with a Gilson 203B fraction collector. Components of the flow system were connected with standard 1/16" TEFLON® tubing and HPLC grade fittings of either stainless steel or polyetheretherketone (PEEK).

Synthesis of Polyaniline-Dinonylnaphthalene Sulfonic Acid (1 Mmol Scale).

The flow system herein described as in FIG. 3, was equilibrated with water from all three syringes at a total initial flow rate of 0.427 mL/min to dislodge any air or bubbles in the flow reactor coil. The temperature of the coil was maintained at 25° C. throughout the process. Once the air was displaced from the system, the syringes in each of the pumps were exchanged with the appropriate reagent. Syringe pump A (Sage pump) was fitted with a 60 mL plastic syringe containing a freshly prepared solution of 0.375 M aniline in distilled, deionized water. The KD Scientific pumps B and C were equipped with 20 mL of 1.0 M DNNSA in n-butylglycol in a 20 mL plastic syringe and 10 mL of 2.0 M ammonium persulfate in a 10 mL plastic syringe, respectively. Based on the above volumes of material introduced into the reactor coil, the reaction scale was designated as a 1 mmole scale. Pumps A (aniline: 0.277 mL/min) and B (DNNSA: 0.1 mL/min) were initiated to start formation of the aniline-DNNSA emulsion. Once the white emulsion reached with second T-mixer, pump C (oxidant: 0.05 mL/min) was started for initiation of the reaction. After a period of time the flow rate was observed to rapidly decline due to increasing back pressure in the system. It was observed in this example that the first 10 mL that exited from the reactor coil contained a heterogeneous mixture of the PANI polymer in the organic phase and some aqueous phase byproducts. This initial fraction was extracted with xylene and the extract washed twice with water. The dried organic layer of this solvent extract was concentrated in vacuo to afford 0.10 g of a blue-green film (UV-Vis spectra 500 in FIG. 11). UV-Vis (dried film) 285, 325, 373, 851 nm; Elemental Analysis: C, 72.64; H, 10.01; N, 1.84; S, 5.41. After a total of about 30 min, flow from pump A was stopped. In one example, the reagent syringes were replaced with syringes containing water to terminate the polymerization in the flow reactor.

Figure 11:
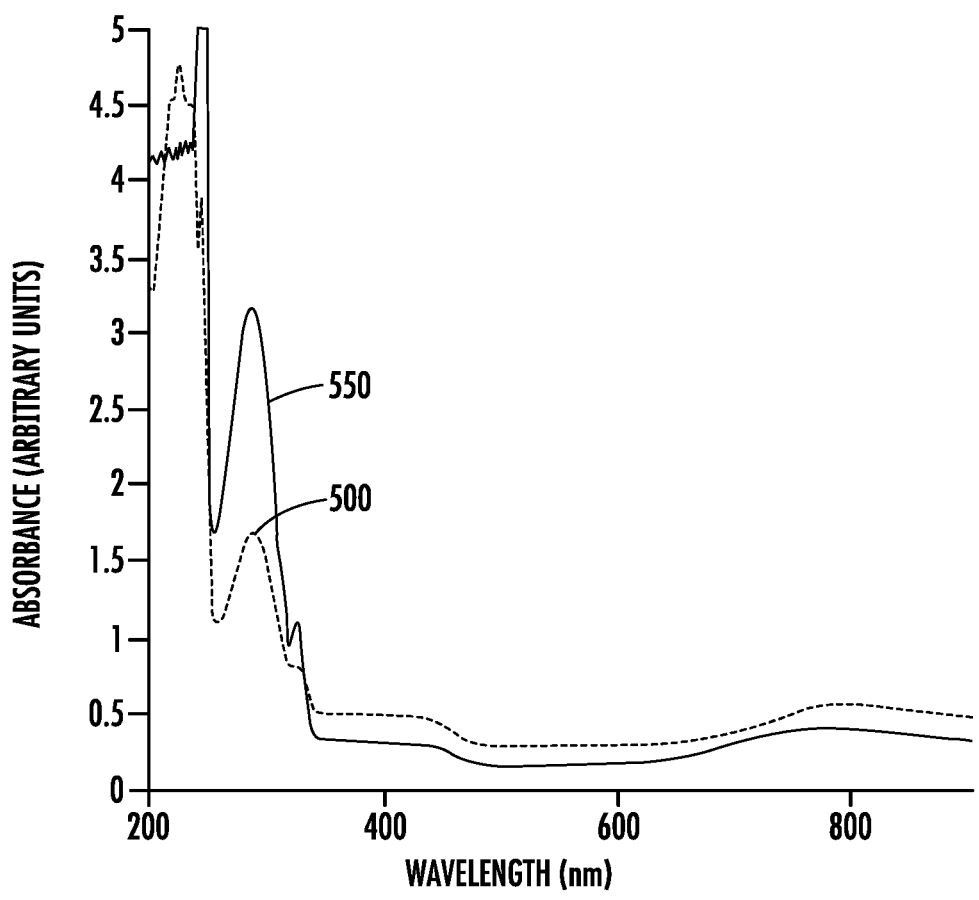
FIG. 11 is a UV-Vis spectrum of PANI-DNNSA prepared using the system and methods disclosed and described herein.

In this example, after polymerization was terminated, the flow reactor was flushed with an amount of water to remove any water soluble reactants or by-products. No PANI products were collected from this water flush and the significant blue color remained in the flow reactor tubing. Following this water flush, the reactor was then flushed with an amount of xylene and the wash collected gave a concentrated blue extract. The solvent extract was dried and concentrated in vacuo to afford 0.31 g of a blue-green film. UV-Vis (dried film) 285, 325, 371, 839 nm, is shown in FIG. 11 as spectra 550. Elemental Analysis: C, 73.49; H, 10.42; N, 1.87; S, 5.14.

Synthesis of Polyaniline-Dinonylnaphthalene Sulfonic Acid (7.5 Mmol Scale).

The flow reactor system was setup as described for the previous 1 mmole scale reaction, however the positions of the pumps and size of the syringes were changed to overcome the initial backpressure from formation and deposition of polymeric material in the flow reactor. Using smaller syringes, the pumps were outfitted as follows: Pump A: 20 mL syringe of 0.375 M aniline, KD Scientific pump; Pump B: 10 mL syringe of 1 M DNNSA solution, KD Scientific pump. Pump C: 10 mL syringe of 2 M $(NH_4)_2S_2O_8$, Sage pump. Samples were collected in 3.5 mL fractions. The initial heterogeneous fractions were worked up as described previously to yield 0.206 g of a blue-green residue. UV-Vis (dried film) 285, 325, 802; Elemental Analysis: C, 72.70; H, 9.83; N, 2.02; S, 5.01.

After collection of the initial fraction, the flow reactor tubing was washed with water using an HPLC pump. Initial measured backpressure for the water wash was 200 psi. The reactor was then flushed with 15 mL of xylene. Once the xylene had displaced water in the reactor coil, the backpressure dropped to less than 5 psi. The xylene flush afforded a major fraction of product; 3.58 g of a blue-green residue. UV-Vis (dried film) 284, 325, 768 nm; Elemental Analysis: C, 74.39; H, 9.99; N, 1.98; S, 4.77. Total yield from the 7.5 mmole scale reaction based on 1:1 stoichiometry of PANI:DNNSA was 3.79 g (91.6%).

Current flow reactors, including micro-reactors, use microfluidic chips or miniaturized columns and specialized equipment for control of the flow devices. The present system and method provides a device that can be assembled from syringe pumps, commercially available HPLC tubing and an aluminum holder outfitted with a standard thermocouple temperature control device. By using syringe pumps to control the flow of reagents, the pressure in the reactor can be held well below the limits of the flow reactor tubing and low pressure fittings. Concentrations and flow rates of reagents can be chosen to provide an overall reaction concentration similar to that used in batch processing. For example, for PANI-DNNSA, the overall reaction concentration after mixing can be 0.23 M, which is very close to the value calculated for previously published batch reactions.

While stoichiometry of the reagents used in the present disclosure was approximately one equivalent each of aniline, DNNSA and ammonium persulfate, other stoichiometry can be used. For PANI, monomer concentration was limited by the solubility of aniline in water, which at room temperature is slightly greater than 0.375 M. Thus, for the exemplary experiment using PANI, Pump A was charged with the 0.375 M aniline solution and delivered at 0.277 mL/min and the DNNSA solution, approximately 50% w/w in n-butylglycol or 1.04 M solution, was placed in pump B and delivered at 0.1 mL/min, and Pump C was charged with a freshly prepared 2 M ammonium persulfate solution delivered at 0.05 mL/min. Each reagent has a delivery rate of 0.1 mmole per minute resulting in a total flow rate for the reaction mixture of 0.427 mL/min. Other total flow rates can be used commensurate with the system parameters and polymer product.

It was noted that both the 1 mmole scale and the 7.5 mmole scale reaction provided two distinct fractions; an initial fraction was obtained in the biphasic reaction mixture which was purified by the usual extraction route; and a larger scale reaction. The first fraction was a minor component representing 5% of the total material. Unexpectedly, the major fraction adhered to the flow reactor tubing. While it did not completely inhibit flow through the reactor, it did increase the back-pressure of the system. Thus, monitoring of the backpressure was used to facilitate monitoring of the reaction process. Based on these results, it is possible to produce PANI-DNNSA product at rates of grams/day for a given flow reactor unit, for example, 10 grams/day, or 20 grams/day, up to about 50 grams/day, of which production amounts can be multiplied by the number of parallel flow reactors used. Thus, the present disclosure provides for a method of producing large quantities of compositionally consistent conductive polymer salts such as PANI-DNNSA cost effectively and with relatively high yield and high production rates.

In both trials, the reactor coil was washed with water to remove aqueous impurities such as sulfuric acid and excess oxidant catalyst, while the major product was obtained by flushing the flow reactor with xylene. Due to the solubility of the PANI-DNNSA product, it is possible to obtain the product in a minimum amount of xylene. The deposition of the PANI-DNNSA product is an advantageous result, allowing removal of aqueous impurities and direct extraction of the polymer in xylene, for example, without post-reactor workup and to provide a product that is capable of being spun coated or precipitated.

FIG. 11 depicts a UV-Vis Spectra of PANI:DNNSA as a dried film, where the UV-Vis spectra 500 of an early first fraction shows similarity with the UV-Vis spectra 550 of major late fraction as products. Expected UV absorptions are seen for an aniline ring and the incorporation of the naphthalene ring in the DNNSA salt. Elemental analysis was obtained and analysis of the mole percent of N and S shows that these elements are present in equal molar amounts, suggesting a one to one ratio of the nitrogen component of PANI and the sulfonic acid of DNNSA or a polymeric material that is 1:1 PANI:DNNSA. Previously reported conductive PANI:DNNSA polymer was obtained in a 2:1 ratio. The present 1:1 material is believed the result of a slight molar excess of DNNSA used in the process. Manipulation of the PANI:DNNSA ratio is possible with the present system and method and allows for varying the ratio in the finished polymer product.

The initial trials with the present flow reactor device have demonstrated the feasibility of preparation of conductive polymer salts from monomers and acid. The system and methods disclosed provide for forming emulsions and introducing the emulsion along with catalyst to a flow reactor. By way of example only, PANI-DNNSA soluble polymer was prepared by the present flow reactor process. For the PANI system, other organic acids for forming salts can be used. Other monomer/salt systems can be used, such as thiophene/polystyrene sulfonate salt, or for in-situ doping during monomer polymerization of conductive polymers.

The description of preferred embodiments for this disclosure has been presented for purposes of illustration and description. It is not intended to be exhaustive or to limit the invention to the precise form disclosed. Obvious modifications or variations are possible in light of the above teachings. The examples are chosen and described in an effort to provide the best illustrations of the principles of the present disclosure and its practical application, and to thereby enable one of ordinary skill in the art to utilize the various examples and with various modifications as are suited to the particular use contemplated.

What is claimed is:

1. A method comprising
   introducing an emulsion of an aqueous solution of monomer and an organic solvent solution of acid into a flow reactor, the flow reactor comprising a length of tubing having an inner diameter;
   polymerizing the monomer under a diffusion-limiting condition within the length of tubing; and
   forming a salt of the polymerized monomer with the acid within the length of tubing.

2. The method of claim 1, further comprising introducing a catalyst to the emulsion.

3. The method of claim 1, further comprising introducing a catalyst to the flow reactor.

4. The method of claim 1 further comprising maintaining the salt of the polymerized monomer in the length of tubing.

5. The method of claim 1, further comprising recovering the salt of the polymerized monomer from the tubing.

6. The method of claim 1, further comprising recovering of the salt of the polymerized monomer from the tubing with organic solvent.

7. The method of claim 1, further comprising maintaining the polymerized acid salt in the length of tubing and removing unreacted monomer or the acid from the tubing with water.

8. The method of claim 1, wherein the length of tubing is coiled.

9. The method of claim 1, wherein the tubing is a fluoropolymer.

10. The method of claim 1, wherein the flow reactor comprises a plurality of tubing arranged in a parallel flow configuration.

11. The method of claim 1, wherein the monomer is an aniline or a thiophene.

12. The method of claim 1, wherein the acid is an organic acid selected from polystyrene sulfonate or dinonylnaphthalene sulfonic acid.

13. A method comprising;
introducing an emulsion of an aqueous solution of aniline and an organic solvent solution of organic acid into a flow reactor, the flow reactor comprising a length of tubing having an inner diameter;
introducing an oxidant to the emulsion or the flow reactor; and
polymerizing the aniline in a diffusion-limiting condition in the inner diameter of the length of tubing and forming an acid salt thereof.

14. The method of claim 13, wherein the molar ratio of aniline to that of the organic acid in the polymerized aniline acid salt is about 1:1 to about 0.2:1.

15. A method comprising
introducing an emulsion of an aqueous solution of a monomer and an organic solvent solution of acid into a flow reactor, the flow reactor comprising a length of tubing, the length of tubing having:
an inner diameter; and
a surface for receiving polymerized monomer upon polymerizing;
introducing a catalyst to the emulsion;
polymerizing the monomer under diffusion-limiting conditions within the inner diameter;
depositing at least a portion of the polymerized monomer on the surface within the length of tubing; and
forming a salt of the polymerized monomer with the acid.

* * * * *